July 13, 1965  
J. F. BLAHA  
3,194,094  
CUTTING MACHINE HAVING MAGNETIC STORAGE MECHANISM  
FOR CONTROL OF WORK FEED MEANS  
Filed Feb. 11, 1963  
4 Sheets-Sheet 1
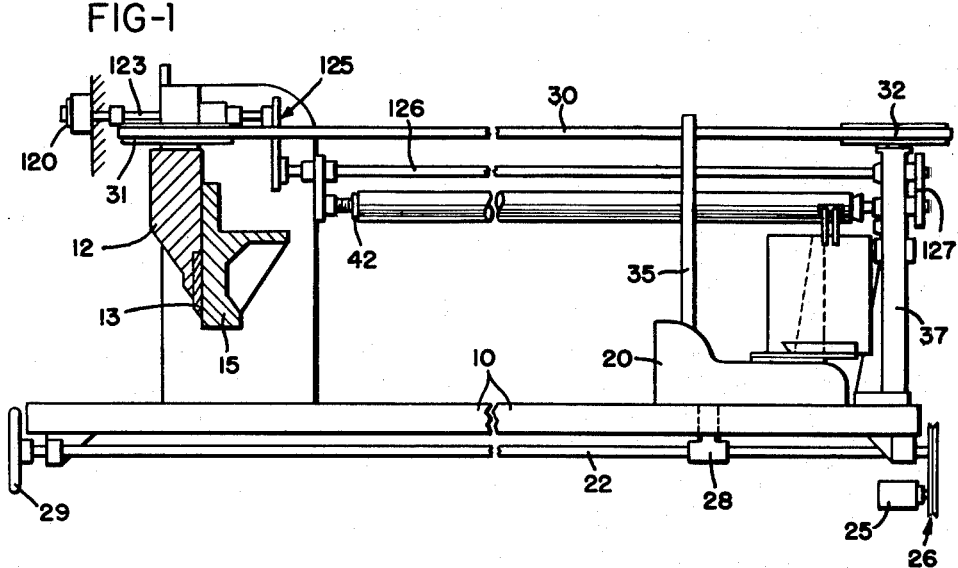
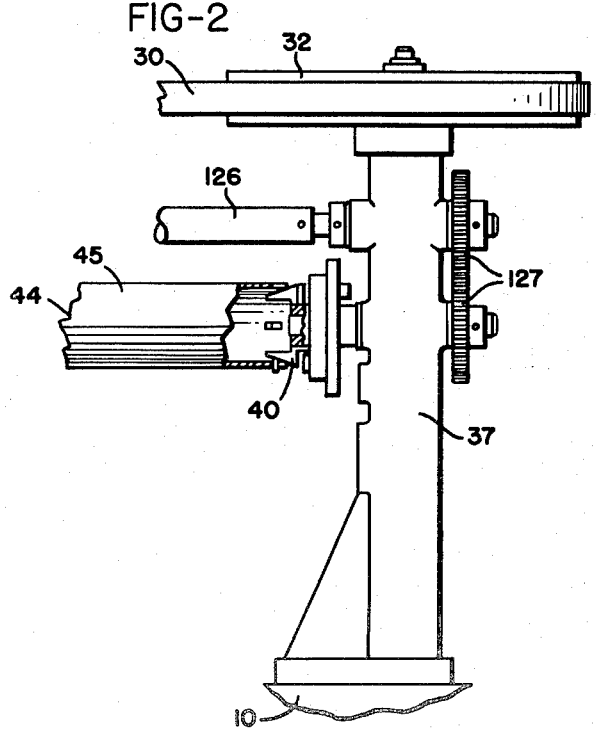
INVENTOR.  
JOHN F. BLAHA  
BY  
*Marshall, Biebel, French & Bugg*  
ATTORNEYS July 13, 1965 J. F. BLAHA 3,194,094
CUTTING MACHINE HAVING MAGNETIC STORAGE MECHANISM
FOR CONTROL OF WORK FEED MEANS
Filed Feb. 11, 1963 4 Sheets-Sheet 2
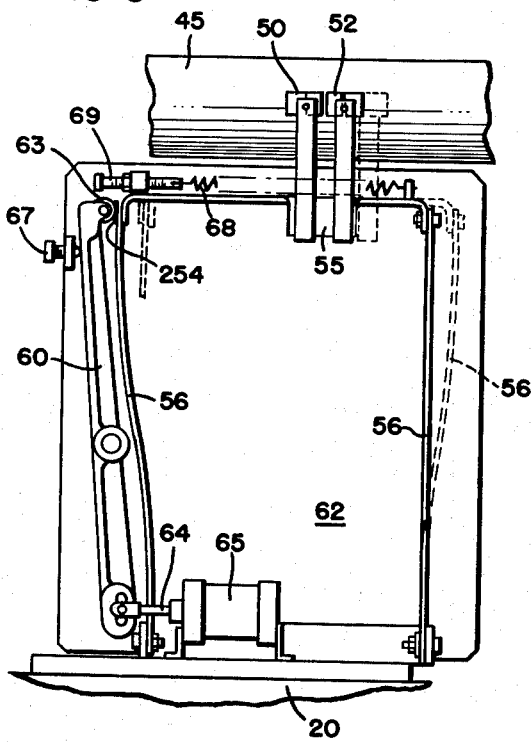
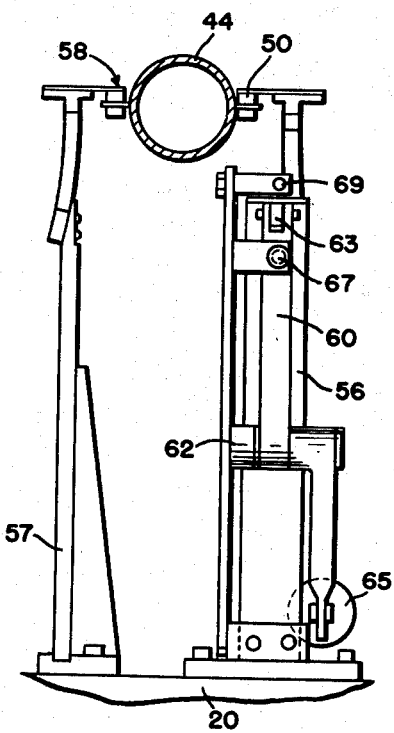
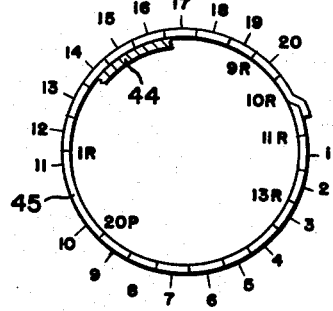
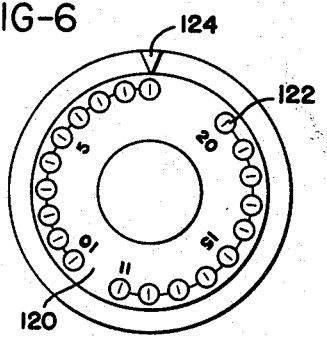
INVENTOR.
JOHN F. BLAHA
BY
Marechal, Biebel, French & Bugg
ATTORNEYS

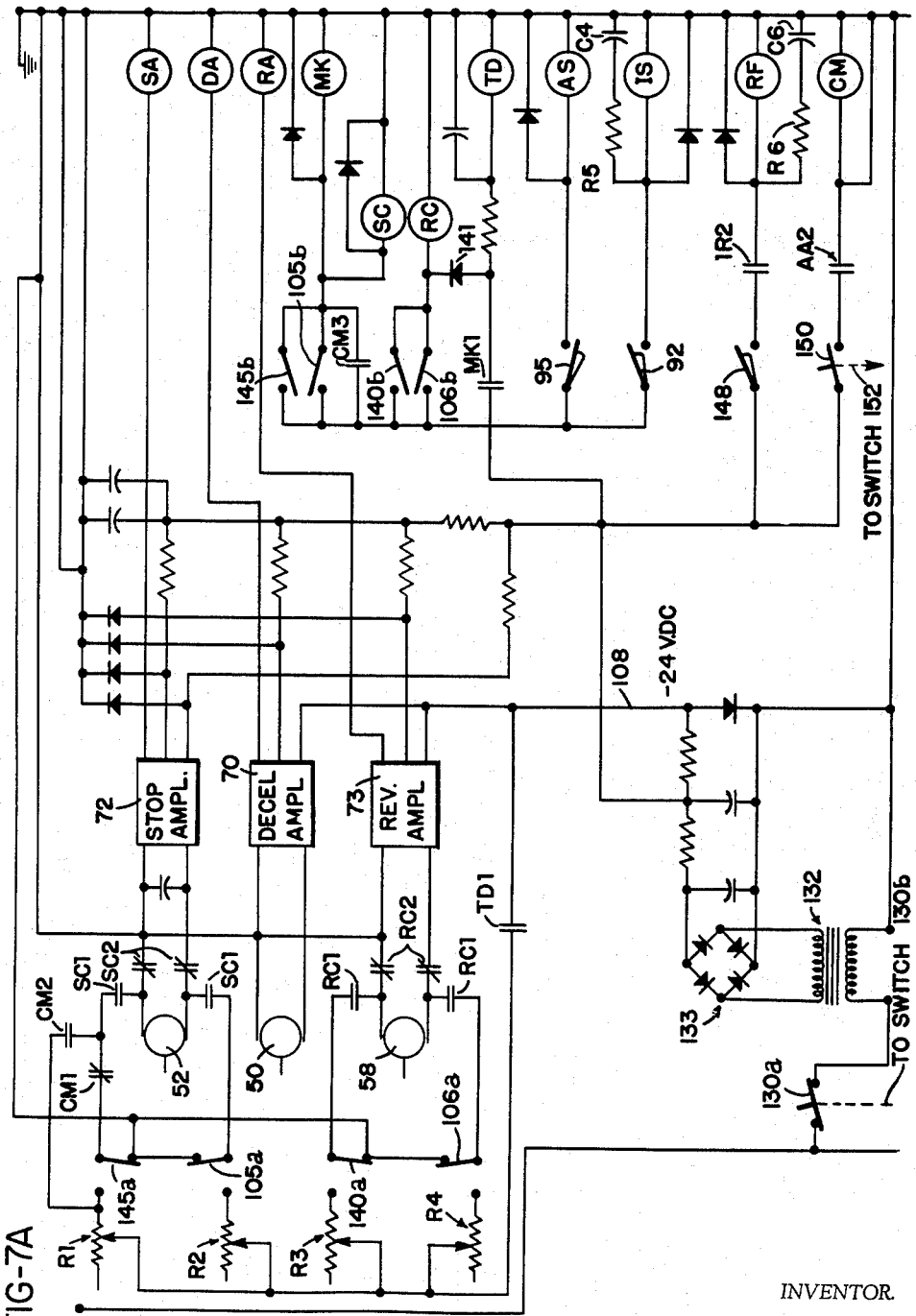

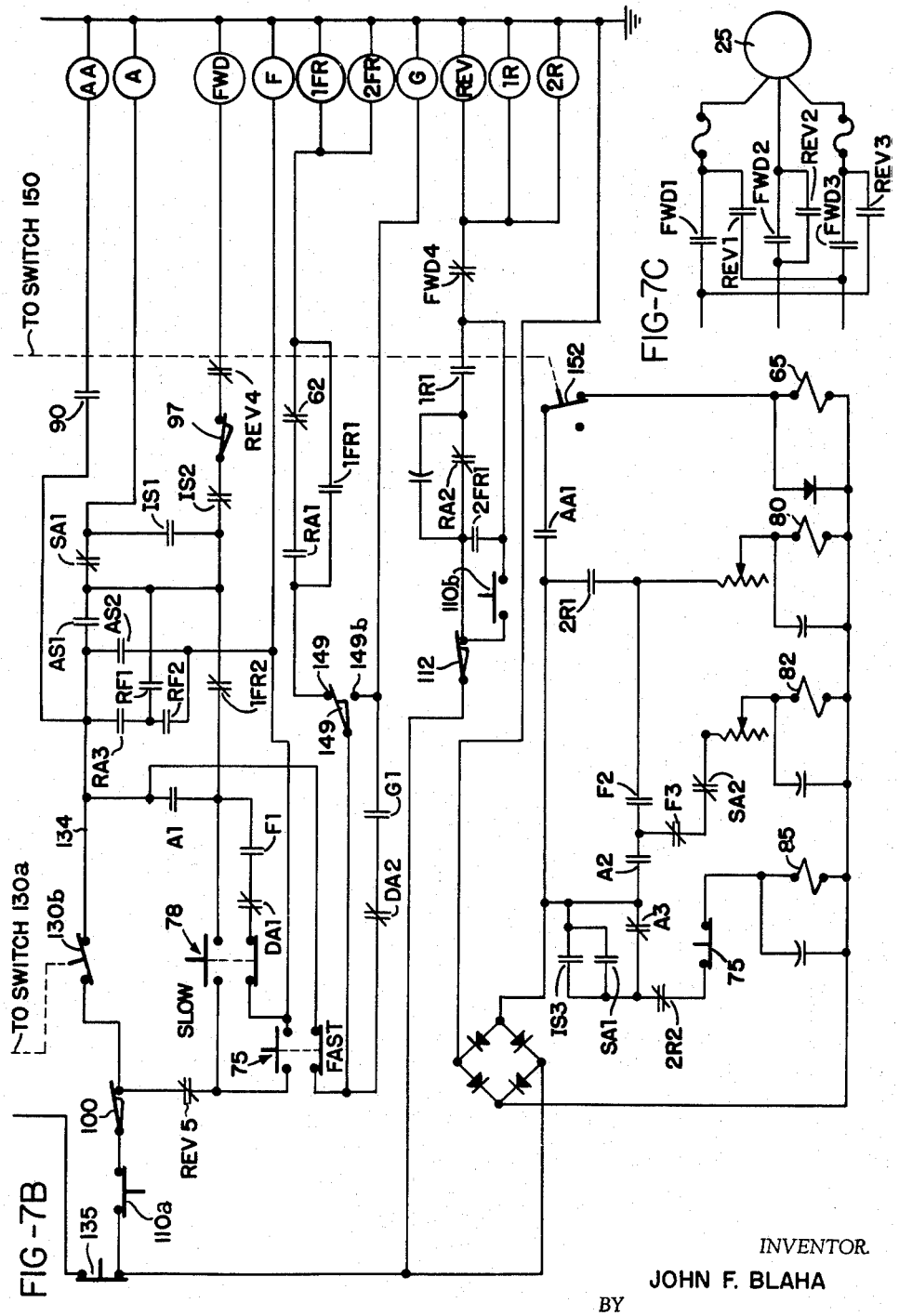

United States Patent Office 3,194,094
Patented July 13, 1965

3,194,094
CUTTING MACHINE HAVING MAGNETIC STORAGE MECHANISM FOR CONTROL OF WORK FEED MEANS
John F. Blaha, Cleveland, Ohio, assignor to Harris-Intertype Corporation, Cleveland, Ohio, a corporation of Delaware
Filed Feb. 11, 1963, Ser. No. 257,694
3 Claims. (Cl. 83—71)

This application is a continuation-in-part of application Serial No. 75,818, filed December 14, 1960, now Patent No. 3,118,334.

This invention relates to cutting machines, particularly for cutting stacks of sheet material such as paper, paperboard, cardboard, and the like, and particularly to a novel back gage control system for positioning the piles of such material with respect to the cutting knife.

In such machines, the stacks of material to be cut are supported upon a work table, and a guillotine type knife is mounted above the table for powered movement toward the table in a cutting plane which intersects the table surface. Immediately adjacent the knife, and independently operable, there is a clamping member which can be moved under power against the stack to hold it stationary during the cutting stroke of the knife. The back gage is in the form of a pusher member which is mounted to move over the surface of the work table for pushing and positioning the stacks of material into and through the cutting plane, thus determining the position at which the stack comes to rest for making the desired cut. The present invention is concerned with such a back gage which is power operated, preferably by a reversible motor, and which is actuated automatically to move the stack forward in a predetermined sequence of movements to perform a series of cuts through the stacked material, this predetermined sequence being generally known in the art, and hereinafter designated, as a "program" or "job program."

The primary object of this invention is to provide a novel control system for positioning a relatively heavy power driven movable member, such as a power operated back gage on a paper cutting machine, at any desired position or sequence of positions within its normal range of movement, wherein a tubular position control record or memory device having a selectively magnetizable surface is mounted for rotation about its own axis, and one or more magnetic recording and/or reading heads are mounted to scan over a path lengthwise of said tubular member in predetermined relation to the movement of the power driven member.

Another object of the invention is to provide such a control system wherein the tubular magnetic storage member is mounted parallel to the path of movement of the power driven member and the magnetic recording and/or reading heads are supported directly from said power driven member to minimize discrepancies between the movement of said heads and the movement of said power driven member.

A further object of the invention is to provide such a novel control system wherein the power driven member can be reversed automatically, at any selected location without need for traveling to the full limit of its motion, returned to a predetermined position along its path of movement without going to its other limit, and then reversed again to move forward to the first of a sequence of position control marks on the control member.

An additional object of the invention is to provide such a novel control system for a heavy power driven member wherein one or more control records for desired sequenced positions of the member may be prepared by positioning the member under manual control in each of the desired positions of the sequence, and recording in the form of a magnetized segment or spot on the control record a signal generating mark which will subsequently produce a control signal to stop the member in that position when such mark is read by a magnetic reading means such as a conventional magnetic pickup head.

Another object of the invention is to provide a novel position control record of the foregoing type which can retain a large number of records within a relatively limited space.

Other objects and advantages of the invention will be apparent from the following description, the accompanying drawings and the appended claims.

In the drawings—

FIG. 1 is a somewhat schematic side view, with certain parts shown in section, illustrating the general arrangement of a cutting machine and back gage control in accordance with the invention;

FIG. 2 is a detail view on a larger scale, showing the rear mount for the magnetic control storage or program storage member;

FIG. 3 is a detail view showing the mounting arrangements for the magnetic recording and/or receiving heads which are carried by the back gage member, and which scan the program record member mounted parallel to the direction of back gage movement;

FIG. 4 is a view looking from the front, i.e., the left, of FIG. 3 showing further details of the receiving and/or recording head mountings, and partciularly the head which operates on the direction control program channels;

FIG. 5 is a schematic view illustrating the manner in which a number of job program and direction control channels are distributed over the surface of the program record member;

FIG. 6 is a somewhat schematic view of a job selector and indicator; and

FIGS. 7A, 7B and 7C are the schematic diagrams of the electrical circuits embodied in the back gage control.

Referring to the drawing, and particularly to FIGS. 1–4, the cutting machine comprises a work table 10 above which is mounted a knife 12 which reciprocates in a generally vertical plane toward and away from the table to make the desired cuts. The knife includes a replaceable blade 13. Adjacent to the knife is the clamp member 15 which also moves toward and away from the table, independently of the knife, to clamp the stack or pile of material for cutting. Various power operated drives and controls for the knife and clamp are known to those skilled in the art, and since they form no specific part of this invention, they are not shown in detail. It should be understood, however, that the knife and clamp can be operated in any suitable manner, and with the usual interlock arrangement with the back gage control to prevent movement of the back gage when a clamping and/or cutting operation is under way.

The back gage 20 is mounted to move over the surface of table 10, toward and away from the cutting plane of knife 12. Power for movement of the back gage is derived from lead screw 22 which is driven, in a preferred embodiment, by an electrical motor 25, through a suitable two speed transmission 26. This lead screw engages a nut 28 on the back gage.

Preferably, and particularly for use during set-up operation, the lead screw may also be rotated manually by the hand wheel 29 which is fixed thereto and positioned at the forward edge of work table 10.

The position of the face or pushing area of back gage 20 is conveyed accurately to the operator by means of a tape 30, preferably metallic, which is reeved about a front wheel or pulley 31 and a rear wheel 32. A mast 35 extends from the back gage member 20 upwardly adjacent to the tape, and is fastened thereto so that movement of the back gage will produce corresponding movement of the tape. The tape preferably is marked in convenient graduations of measurement which can be viewed with reference to an index mark at the front of the machine by the operator. The rear wheel 32 is mounted on a vertically extending post 37 at the rear of the work table, and this post provides support for a rear mounting jaw 40 which, together with a spring loaded forward jaw 42 (FIG. 1), forms a rotatable support for the program record or memory device, which is in the form of a tube 44 having a surface coating in the form of a tape 45 of material capable of retaining a magnetic "spot," for example by means of minute ferro-magnetic particles in the coating which will become and remain magnetized when exposed to an electrical field, and which can be "erased" by forming a uniformly magnetized path or channel along the material with an opposed field. The coating can, of course, be formed directly on tube 44, instead of a tape, if desired. Actually, these "spots," in the form of discrete segments of the channels which are oppositely polarized from the rest of the channel, can be aptly described as "magnetic marks" which will produce a pulse of electricity in a reading head when there is relative movement between the magnetized or marked area and the head. It will be understood that marks may therefore be placed upon the memory device in a number of longitudinal paths, each path forming a program record, and, for purposes of illustration these have been marked on FIG. 5 as program channels 1 to 20. There are also intermediate channels for a separate recording and/or reading head, to be used in controlling the forward or reverse operation of the back gage motor 25, and these are appropriately marked 1R, 2R, etc., being in the illustrated example diametrically opposed to the corresponding job program channel.

In a preferred embodiment of the invention, the back gage motor 25 drives a two speed transmission 26, and is thus capable of advancing the back gage member 20 at a higher speed and moving it subsequently at a slower speed to its precise desired position. Such an arrangement is preferred since it overcomes the possibility that inertia of the back gage member after a relatively long and continuous forward motion may cause it to overshoot the desired position if stopped from the higher speed.

Accordingly, there is a circuit for charging the drive ratio of transmission 26 from fast to slow when the back gage is determined to be approaching a magnetic mark indicating a desired position. This circuit, which will be explained further on in detail, responds to a magnetic receiving head 50, while a separate magnetic receiving and/or recording head 52, spaced a predetermined distance behind the head 50, produces stop pulses to halt the back gage in the desired positions. These heads are mounted on a frame 55 which is in turn supported by a pair of spring arms 56, and they are anchored to the back gage member 20. During normal operation, the heads are in the position shown in full lines in FIG. 3, and they move forward, in unison, along with the back gage member and thus scan the job program channel with which they are aligned. Similarly, on the opposite side of the tube 44, there is a mast or bracket 57 which extends upwardly and forms a mounting for a receiving and/or recording head 58 which scans, at the same time, the corresponding direction control channel.

The head 52 is also used for recording, by magnetizing portions of the material 45 in a particular selected program channel. This is accomplished by having the head 52 connected in one polarity for reading, and in an opposite polarity for recording, as will be explained. The head 58 performs the same dual function of recording and/or reading in the same general manner.

Because of the nature and function of the heads 50 and 52, they must be spaced apart a certain physical distance, and the machine may be called upon to perform certain trim cut operations which require a forward movement of the back gage member by a distance less than this spacing between these heads. Such slight movement should be accomplished at the slower speed drive. Therefore, in order to assure that a so-called trim cut mark is located between the heads 50 and 52 when the back gage has halted with the head 52 opposite a mark, it is necessary to perform a scanning operation of the heads prior to resumption of back gage movement. Thus, scanning movement is provided by moving the heads 50 and 52 in a direction causing reverse relative movement between the heads and the program memory device with respect to their normal relative movement during forward motion of back gage member 20. This so-called "pre-scanning" movement is accomplished by shifting the frame 55, by reason of its flexible spring-like mountings 56. These form a parallelogram type of linkage which assures essentially straight line motion of the heads along the selected channel on which the device is operating.

A lever 60 is pivotally mounted on a bracket or plate 60 which extends upwardly from the back gage member. At its upper end the lever carries a roller 63, and at its lower end the lever is connected through link 64 with a solenoid 65. An adjustable stop screw 67 normally engages the upper arm of lever 60, and the frame and spring mounting is held in contact with roller 63, and thus arm 60 is held in contact with screw 67, by a spring 68. This spring is anchored at one end to the frame 55 and at its other end to an adjustable tensioning screw 69 which is mounted on the plate 62. This screw forms a convenient adjustment of spring tension, and of course the solenoid 65 functions against this spring to move the heads through a pre-scanning motion the limit of which is shown by the dotted line illustration in FIG. 3.

If the head 50 senses a mark during its scanning motion, a circuit is completed, as will be described, to cause the back gage to start in the slower speed. The heads have returned to their forward or at rest position before the back gage member begins to move. This is accomplished by a momentary energization of solenoid 65, causing the scanning motion at the end of which the heads return to their normal position.

The circuit diagram, FIG. 7, shows the heads 50, 52 and 58 schematically. The head 50 functions only as a reading head, and it will transmit an impulse, upon approaching a mark on the memory device through the decelerating amplifier 70 which will in turn energize the relay DA. Similarly, the head 52 will cause the stop amplifier 72 to transmit an operating pulse to the relay SA, and the head 58 will cause the reverse amplifier 73 to operate the direction control relay RA.

*Read and stop*

For purposes of explanation, it will be assumed that the back gage member 20 is at its farthest or full rear position from the knife, and that it is at rest. The operator initiates movement of the back gage by momentarily pressing the fast switch 73 to complete a circuit through the relay F. Contacts F1 closes, energizing relay FWD, and energizing relay A through the normally closed contacts SA1. Relay A in turn completes a holding circuit for the relay F through the back contacts of the slow switch 78, via contacts A1. Thus, once the fast switch 75 is momentarily depressed, the relay F locks in.

Relay F also has a contact in the motor control circuit which will then complete a circuit through the fast or higher speed clutch 80, causing the back gage member to move forward at its higher speed. When the first mark, on that control channel aligned with the heads, is reached by the head 50, this will transmit a pulse through the amplifier 70 to cause the relay DA to be momentarily energized. This relay then opens its normally closed contacts in the holding circuit for relay F, and that relay drops out. At the same time, this will open the contacts of relay F in the circuit of the fast clutch 80 (incorporated in transmission 26), and close the normally closed contacts of this same relay in the circuit of the slow clutch 82 in the transmission. The back gage proceeds forward at its slower speed.

The head 52 is then approaching the same mark which caused the "slow down" pulse from head 50. When head 52 reaches this mark it transmits a pulse through amplifier 72 to momentarily energize relay SA. This relay opens its contact in the slow clutch circuit and closes its contact in the circuit of the brake coil 85, and a brake is engaged to hold lead screw 22, stopping the back gage immediately. The normally closed SA contacts in the circuit relay A are opened concurrently at this time, and that relay is deenergized to interrupt the power supply to the fast and slow clutches (only the latter was operative) and to seal in the brake circuit through the normally closed A contacts which are in parallel with the normally open SA contacts.

*Scan and continue*

In normal operation, once the back gage is stopped the operator will actuate the usual controls to cause the clamp 15 to descend, followed by the knife 12 which will sever the pile at the designated place. Suitable interlock arrangements are provided, which per se form no part of the present invention, to assure that the back gage remains stationary during the clamping and cutting operation. A convenient such interlock may be provided by a solenoid (not shown) which has normally open contacts 90 in the energizing circuit of the coil of relay AA. Thus, with such an arrangement this solenoid can be energized as the knife passes through its up stroke, the contacts 90 will be closed, and relay AA energized. This relay has a first set of normally open contacts AA1 in the energizing circuit of the pre-scanning solenoid 65 (see FIGS. 3 and 7B). When this solenoid begins to move its armature, it closes a switch 92 which in turn energizes the coil of the IS relay. This relay has normally open contacts IS1 which then close and normally closed contacts IS2 which open, in the circuit of the relay FWD. Also, contacts IS3 in the circuit of brake coil 85 are also closed to hold the brake on during the scanning operation.

When the armature of the pre-scan solenoid 65 is moved to its full extent, this causes closing of switch 95 which in turn energizes the coil of the AS relay. Thus, the contacts AS1 are closed and complete a circuit through the normally closed contacts SA1 to the coil of relay A. This relay is locked in through its contacts A1 and the normally closed SA1 contacts. The contacts AS2 of the AS relay also are closed when it is energized, and complete a circuit through the coil of the F relay which also locks in through the contacts F1 and A1 and the back contacts of the slow switch 78. In the lower portion of FIG. 7B, contacts A2 and F2 close, completing the circuit through the fast or higher speed clutch coil 80.

When the relay contacts 90 are opened, as the knife comes to a stop at its raised position, relay AA is deenergized, and its contacts AA1 open to deenergize the pre-scanning solenoid 65. As this solenoid releases its armature, the switch 95 is opened, to deenergize the AS relay, and as the armature reaches its terminal deenergized position switch 92 opens to deenergize the IS relay. This in turn causes the contacts IS2 to return to their normal closed condition and, so long as the clamp is raised permitting the clamp interlock switch 97 to close, then the relay FWD will be energized, closing its contacts FWD1, and 2 and 3 in the directional control circuit of the back gage motor 25 (FIG. 7C). The back gage will thus proceed forward at its higher speed.

*Slow start forward*

If during the scanning movement the pickup head 50 crosses a mark on the program channel which rests between the heads 50 and 52 as they stopped, it will send a pulse through the decelerating amplifier 70 to energize the DA relay. It should be recalled that when the head 50 first sensed a stop mark it caused the transmission to shift to the slower speed, and also transferred control from itself to the stop head 52. Thus, if there is a mark denoting a trim cut which immediately follows the first mark, at a spacing closer than the physical spacing between the heads 50 and 52, then the head 50 will pass over this second or trim cut mark without effect on the circuit. However, this is the purpose of the scanning operation, namely to determine whether such a trim cut mark is then between the heads.

Assuming that there is a trim cut signal mark, when relay DA is energized this will open the normally closed contacts DA1 in the holding circuit of relay F, causing it to be deenergized and thereby opening the contact F2 in the circuit of fast clutch 80. At the same time, normally closed contact F3 will close to complete a circuit through the slow clutch coil 82, and the back gage will move forward at its slower speed.

It should be noted that when the head 52 passes over a pulse during the scanning operation, the resultant pulse through amplifier 72 will energize relay SA, causing the normally closed contacts SA1 to open momentarily. Therefore, to insure that relay A is kept energized, relay IS must be held energized, to keep contacts IS1 closed, until relay SA returns to normal, and contacts SA1 are again closed. This is accomplished by the condenser C4 which is charged through resistor R5 while the switch 92 is closed. When this switch opens, C4 discharges through the coil of relay IS for the overlap interval required.

The actual scanning operation occurs when the heads 50 and 52 move back to their normal positions, i.e., from the dotted toward the full line position as shown in FIG. 3.

*Erasing and marking*

The functions of erasing programs no longer needed from the channels on which they are recorded is somewhat related to the function of recording new programs on the "empty" channels. Therefore, these functions will be described concurrently. To erase, the back gage is brought to its forwardmost position, for example by holding closed the fast switch 75, at which time the back gage will proceed forward until it opens the forward limit switch 100. Then, referring to FIG. 7A, the erase switches are closed manually. These switches each include contacts in several different circuits which are actually operated in unison. They are, therefore, designated as switch 105a, shown in the read position, and switch 105b in the circuit of the MK and SC relays, shown open. Switch 106b is in the circuit of the RC relay, also shown open, and switch 106a in the circuit of the reversing control head 58.

With the erase switches actuated, relays MK, SC and RC are all energized. With respect to the stop head 52, the normally open contacts SC1 are closed, and the normally closed contacts FC2 are opened. Since only the switch 105a has been actuated, a circuit is completed from the −24 volt D.C. supply line 108, through the adjusting potentiometer R2 and through head 52 to ground via the now closed contacts SC1. This circuit is completed at the contacts TD1 since the TD relay is energized by closing of contacts MK1 when the switch contacts 105b were closed to energize MK. At the same time, a circuit is completed through 106a and the now closed contacts RC1, through head 58 to ground. The normally closed RC2 contacts are, of course, open since relay RC is energized, with switch 106b closed. The potentiometer R4 provides a trim adjustment for this energizing circuit.

The operator then can cause the back gage to proceed to its rearmost position by pressing the reverse switch, which opens the reverse switch contacts 110a and closes the reverse switch contacts 110b. This causes the reverse relay (REV) to be energized, as well as the 1R and 2R relays. Relay REV will thus close its contacts REV1, 2 and 3 in the circuit of motor 25 (FIG. 7C) and relay 1R will close its contacts 1R1 which form a holding circuit for these three relays through the rear limit switch 112. When the back gage reaches its rearmost position this switch will open, deenergizing these relays, and causing the back gage motor to stop. The rearward movement proceeds at high speed, since contacts 2R1 of the relay 2R are closed completing a circuit through the fast speed clutch 80, while the normally closed contacts 2R2 are opened in the circuit of brake coil 85, to prevent energizing of the brake. These contacts, of course, revert to normal when the rear limit switch 112 opens and the relays REV, 1R and 2R are all deenergized.

To "mark" on the magnetic memory system, the desired channel is selected, and this may be done by rotating the scribed head 120 (FIGS. 1 and 6). This head has a dial on the front marked with the appropriate positions for the number of channels available, and there is a manually moveable pin 122 for each channel which can be depressed to engage with a detent or stop (not shown) behind the dial head to hold the head and its attached shaft 123 in the desired position with reference to an index mark 124 adjacent to the dial face. Shaft 123 is connected, for example by the chain and sprocket drive 125 shown schematically in FIG. 1, to a countershaft 126 which extends over the memory tube 44 and is journaled in the rear post 137. Gears 127 provide a drive connection from the countershaft 126 to the rear mounting jaw 40, therefore the tube with its magnetizable surface 45 will rotate in unison with the dial 120.

To record a program, the operator must first be sure that the manually operable spacer control switch is closed. This switch has a first contact 130a (FIG. 7A) which completes a power circuit to the transformer 132 which in turn supplies power to the full wave diode rectifier 133. The other contact 130b (FIG. 7B) of the spacer switch is in a series circuit with the forward limit switch 100 and the reverse switch 110a, and if these are closed it will complete a circuit to line 134 which provides power for energizing the relays A, AA, and FWD, and in some cases relay F, provided the other contacts are appropriately closed.

The back gage can be moved forward by manual closing of either the fast switch 75 or the slow switch 78, preferably the latter, and, as previously described, this will complete circuits through the forward relay FWD to energize the motor 25 and an appropriate one of the clutch coils 80 or 82. The back gage is stopped at the desired position by manual operation of stop switch 135 (FIG. 7B) which will cut the power to the relays, and thereby cause both transmission control coils 80 and 82 to be deenergized, and will cause the brake coil 85 to be energized.

It will be assumed that the back gage has now been located at the rearward position at which it must go before starting forward on the job program to be recorded, by adjustment of the hand wheel if needed. This position, of course, will be somewhat forward of the rearmost position attainable by the back gage. The operator can now record a reverse mark on the reverse channel aligned with head 58 by closing switch 140a and switch 140b. Switch 140b energizes the RC relay, whose normally closed contacts RC2 will open to disconnect head 58 from amplifier 73 while the RC1 contacts will close completing a circuit from line 103 through contacts TD1 (the TD relay is energized along with the RC relay, through the diode 141) and through the trimming potentiometer R3 to ground. Thus, a D.C. current of reversed direction from that used for erasing is applied through the head 58, and this will in effect create a small "spot" or "mark" on the channel opposite in polarity to the entire remainder of that channel, as is well known in the art of magnetic recording and erasing.

To record the various stop marks on the forward control channel the operator then causes the back gage to move forward, by appropriate operation of switches and possibly of hand wheel 29, as previously described, and while viewing the tape 30 to ascertain when the back gage reaches the desired position for the first cut. To record a mark on the control channel at this position, the operator closes switches 145a and 145b. Switch 145b will complete energizing circuits through the relays MK and SC, and due to closing of contacts MK1, through the relay TD. This results in completion of a D.C. circuit from line 103 through TD1, through the trimming potentiometer R1, through switch 145a and the now closed contacts SC1 through head 52 to ground. Again, this D.C. current is in reverse direction to that used for erasing, and thus places a "magnetic" mark on the channel. The contacts SC2 are of course open at this time, disconnecting head 52 from amplifier 72.

The same operation of pre-scanning and advancing the back gage, either starting in high or low speed, depending upon whether a trim out mark is sensed during the pre-scanning, will be repeated for each mark of the job program. After the last mark, the operator may place a mark in the reverse channel which will cause the back gage motor to reverse and will return the back gage to the position located by the previous mark at the rear of the reverse channel, or it is possible to permit the back gage merely to come to its forward limit switch 100. If a reverse mark is used, then the back gage will automatically return itself to the beginning of the job control program, ready to start anew.

*Automatic direction reversal*

The foregoing discussion has assumed only manual control over the forward and reverse movement of the back gage, as would likely be used during recording operations. There are also circuits for automatically reversing the direction of movement of the back gage, as follows.

Assuming first that the last signal in a control program has been passed, relays A, FWD and F will be energized. The pickup head 58, upon sensing a reversal mark on the direction control channel will send a pulse through amplifier 73 which energizes relay RA. This closes contacts RA1, energizing relays 1FR and 2FR. Then, contacts 1FR1 close to form a holding circuit and contacts 1FR2 open to break the holding circuit for relays A, FWD and F. Contacts 2FR1 close to energize relay REV, 1R and 2R. After a momentary overrun, the back gage will reverse, due to the opening of the contacts FWD1, 2 and 3, and closing of contacts REV 1, 2 and 3. The head 58 will again pulse the RA relay, as this head comes back across the same mark which initiate this sequence, but the circuits are not effected as relay 2FR continues to hold relays REV 1R and 2R energized.

Switch 148 (FIG. 7A) which is in the circuit for relay RF, is a mechanically operated switch arranged to close only during the major portion of reverse travel of the back gage, and through the reverse to forward movement thereof. Any suitable linkage, such as a disk operated through a slip clutch from the back gage drive, can be arranged to perform this function. Switch 149 (FIG. 7B) in the circuits of the 1FR, 2FR and G relays is operated simultaneously with switch 148.

Therefore, after the back gage proceeds with its reverse movement, switch 149 is moved from contact 149a to contact 149b. This breaks the circuit of relays 1FR and 2FR and energizes relay G, which seals in through contacts G1, holding this condition until the end of reverse travel of the back gage. Simultaneously, switch 148 energizes the RF relay, since contacts 1R2 are closed. This also completes a circuit through resistor R6 and condenser C6. Contacts RF1 and RF2, in the circuit of the FWD relay (FIG. 7B) are closed at this time, preparing for the following action.

When head 58 reaches the mark identifying the rearward end of travel desired for the back gage, it pulses the RA relay, and this opens contacts RA2 and closes contacts RA1 and RA3. When RA2 opens this breaks the circuit holding the relays REV 1R and 2R, and when RA1 and RA3 close, RA3 energizes relays A, FWD and F, through the already closed contacts RF1 and RF2.

It should be noted that when relay 1R is deenergized it opened its contacts 1R2 in the circuit of the RF relay, but condenser C6 discharges through resistor R6 into the coil of RF relay, holding it until relay A is energized to seal in the FWD circuits.

After a slight overrun, the back gage will start forward at fast speed, and then switches 148 and 149 revert to their normal condition, i.e., as shown. The head 58 passes the same mark going forward, there is another pulse to the RA relay, however, its contacts cause no change in the circuits, since relay G is still held energized to prevent a false action of 1FR and 2FR. However, the first time the back gage stops at a mark in the control program, the circuit to relay G is broken because relay DA is energized, and its normally closed contacts DA2 open.

*Simultaneous cut and mark*

From the foregoing it will be understood that once the operator has recorded a program in a particular channel, this program can be repeated at will, until it is erased. The marking sequence described above was described with reference to manual placement of the magnetic "marks" on the job channel, and this of course can be done with or without a stack of material to be cut according to that program actually placed on the table before the back gage. It is also possible to provide a control whereby the back gage can be operated, with manual manipulation of its controls, through the first sequence of a particular job, and the job actually performed, by making each cut of the job, while at the same time preparing the record by recording into a channel on the memory device. This type of control is the subject of copending application Serial No. 145,914, filed October 18, 1961, and assigned to the assignee as this application.

To accomplish this function, the operator closes switch 150. In order for this switch to complete a circuit, the contacts AA2 must be closed, but the AA relay will be energized only when the knife is operated, during which time the contacts 90 are momentarily closed. Switch 150 is linked mechanically to switch 152, and the latter will open when switch 150 is closed, thereby opening the circuit to the scanning solenoid 65. A pile of material thus can be placed before the back gage and brought to position where the first cut should be made. When the knife is actuated the contacts 90 will close to energize relay AA, and contact AA2 will close completely a circuit to energize relay CM.

It is necessary, of course, to have the head 52 energized for marking during this procedure, and thus the switches 145a and b will be placed in the marked position. Switch 145b will be closed to energize the MK and SC relays, and closing of MK1 contacts will energize the TD relay. However, since relay CM is energized it will open its normally closed contacts CM1 and close contacts CM2. This circuit in effect bypasses the switch 145a but it completes a circuit through the closed contacts SC1 to ground, thus momentarily placing an energizing potential on the head 52. Therefore, each time the knife is operated and the contacts 90 are closed the foregoing sequence will occur, resulting in placement of a mark on the channel of the memory device. Since switch 152 is open, when the cutting operation is complete there will be no energizing of the scanning relay 65, and thus automatic scanning and subsequent forward operation of the back gage will be prevented.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination with a movable member arranged to be driven along a predetermined path and having a selectively operable reversible drive means connected thereto for moving said member and for stopping said member at any preselected position along its path of movement, an elongated tubular position recording and control member having a length corresponding to the complete path of movement of said member, said control member having a selectively magnetizable surface thereon capable of storing reference marks in the form of magnetized spots along a plurality of different paths longitudinally thereof, means mounting said tube in spaced parallel relation to said path of movement of said member, recording means operable to magnetize small segments of a selected one of said paths to create position control marks, magnetic reading means operable to sense said control marks and to produce a control signal therefrom, a mounting bracket extending from said movable member toward said tubular control member and providing a mounting for said recording means and said reading means alongside said tube to cause scanning thereof along one of said paths on said tube during movement of said movable member, means for rotating said tubular control member to locate different ones of said paths in alignment with said recording means and said reading means, a recording circuit selectively connected to said recording means to create a position control mark on that segment of the path on the control member which is then aligned with said recording means, and control circuit means connected to receive control signals from said reading means and operative on said drive means to stop said drive means in response to a signal from said drive means.

2. In combination with a movable member arranged to be driven along a predetermined path and having a selectively operable reversible drive means connected thereto for moving said member and for stopping said member at any preselected position along its path of movement, an elongated tubular position recording and control member, said control member having a selectively magnetizable surface thereon capable of storing reference marks in the form of magnetized spots along a plurality of different paths longitudinally thereof, means mounting said tube for rotation about its longitudinal axis, recording means operable to magnetize small segments of a selected one of said paths to create position control marks, magnetic reading means operable to sense said control marks and to produce a control signal therefrom, a mounting bracket driven from said movable member and arranged to scan along said tubular control member, means on said bracket providing a mounting for said recording means and said reading means alongside said tube to cause scanning thereof along one of said paths on said tube during movement of said movable member, means for rotating said tubular control member to locate different ones of said paths in alignment with said recording means and said reading means, a manual control for said drive means to stop said movable member in desired positions, a recording circuit selectively connected to said recording means to create a position control mark on each segment of the path on the control member which is aligned with said recording means by operation of said manual control, and control circuit means connected to receive control signals from said reading means and operative on said drive means to stop said drive means in response to a signal from said drive means.

3. In a paper cutter having a power operated knife, a table for supporting piles of material to be cut by said knife, and a power operated back gage movable over said table toward and away from said knife to position a pile for cutting; the improvement comprising selectively operable and reversible drive means for said back gage for effecting controlled movement thereof, a memory device in the form of a tube mounted to extend along the path of movement of said back gage and having a surface thereon capable of storing a plurality of magnetically created marks indicating desired positions of said back gage, a position control reading/recording head movable with said back gage and positioned to scan along said tube and selectively to record reference marks thereon and to read the reference marks therefrom for producing control signals, a direction control reading/recording head also mounted to move with said aforementioned head along said tube on a different path and selectively to create direction control marks along said different path and to read direction control marks therefrom, control circuitry connected to receive signals from each of said heads and including a drive reversing circuit operable in response to a signal from said direction control head during movement of the back gage toward the knife to reverse said drive means and simultaneously to make ineffective control signals from said position control head whereby said back gage is then operated in a reverse direction to move away from the knife, and said reverse control circuit including means responsive to a subsequent signal from said direction control head to again reverse said drive means and thereby to cause said back gage to move forward toward said knife and simultaneously to restore the control of said drive means to said circuits responsive to said position control head.

References Cited by the Examiner

UNITED STATES PATENTS

| | | | |
|---|---|---|---|
| 2,475,245 | 7/49 | Leaver et al. | 318—162 |
| 2,737,158 | 3/56 | Seybold et al. | 83—365 X |
| 2,860,705 | 11/58 | Thumin. | |
| 2,916,801 | 12/59 | Lyttle | 83—71 X |
| 2,992,578 | 7/61 | Hribar | 83—71 |
| 2,994,000 | 7/61 | Schoppelrey | 83—71 X |
| 3,012,453 | 12/61 | Mottu et al. | 318—162 X |
| 3,031,054 | 4/62 | Thumin | 83—467 X |
| 3,118,334 | 1/64 | Blaha | 83—71 |

ANDREW R. JUHASZ, *Primary Examiner.*